United States Patent [19]

Shimosato

[11] Patent Number: 4,864,327

[45] Date of Patent: Sep. 5, 1989

[54] PRINTER

[75] Inventor: Masashi Shimosato, Shizuoka, Japan

[73] Assignee: Tokyo Electric Co., Ltd., Tokyo, Japan

[21] Appl. No.: 242,135

[22] Filed: Sep. 9, 1988

[30] Foreign Application Priority Data

Sep. 11, 1987 [JP] Japan ................................ 62-227997

Sep. 11, 1987 [JP] Japan ................................ 62-227998

[51] Int. Cl.[4] ........................... G01D 15/16; B41J 3/04

[52] U.S. Cl. ................................................ 346/140 R

[58] Field of Search ......................................... 346/140

[56] References Cited

U.S. PATENT DOCUMENTS 4,700,204 10/1987 Nakayama ...................... 346/140 R 4,706,098 11/1987 Nakayama ...................... 346/140 R 4,710,784 12/1987 Nakayama ...................... 346/140 R 4,768,044 8/1988 Shimosato .......................... 346/140

FOREIGN PATENT DOCUMENTS 0195652 9/1986 European Pat. Off. .

0257985 2/1988 European Pat. Off. .

56-170 1/1981 Japan .

56-4467 1/1981 Japan .

*Primary Examiner*—Joseph W. Hartary

*Attorney, Agent, or Firm*—Oblon, Spivak, McClelland, Maier & Neustadt

[57] ABSTRACT

A printer comprising a plurality of recording electrodes capable of storing ink therein and jetting the ink from the respective front ends thereof, a counterelectrode disposed opposite to the recording electrodes with a recording sheet therebetween, a driving circuit for selectively applying a voltage pulses across the recording electrodes and the counterelectrode, and a pulse waveform control circuit which regulates the waveform of a voltage pulse to be applied to one of the recording electrodes according to the operating conditiion of the rest of the recording electrodes or a voltage control circuit for regulating a voltage to be applied to the recording electrode so that an electric field having a fixed field intensity distribution is formed always between the recording electrode and the counterelectrode. Thus, a fixed quantity of the ink is jetted always for every printing operation from the front end each recording electrode, and thereby characters are formed in a high print quality.

8 Claims, 9 Drawing Sheets

PRINTER

FIELD OF THE INVENTION AND RELATED ART STATEMENT

The present invention relates to a nonimpact printer which uses electrostatic acceleration of ink particles for forming characters.

Referring to FIG. 11 showing a conventional nonimpact printer, a recoding electrode 3 is immersed in ink 1 contained in an ink container 2. The recording electrode is formed of an electrically conductive material in a construction capable of storing the ink 1. The front end 3*a* of the recording electrode 3 projects outside the ink container 2 through an opening 2*a* formed in the ink container 2. A counterelectrode 5 is disposed behind a recording sheet 4 opposite to the exposed front end 3*a* of the recording electrode 3. The recording electrode 3 and the counterelectrode 5 are interconnected through a driving circuit 8 including a switching circuit 6 and a power supply 7.

When the recording electrode 3 is driven, an electric field is produced between the recording electrode 3 and the counterelectrode 5, and thereby an electrostatic force acts on the ink impregnating the front end 3*a* of the recording electrode 3. Then, the ink is jetted by electrostatic acceleration toward the counterelectrode 5 to form a character on the recording sheet 4 placed before the counterelectrode 5.

Another conventional nonimpact printer is provided with a plurality of recording electrodes 3. Such a nonimpact printer is capable of operating at a very high printing speed, because the plurality of recording electrodes 3 are able to jet the ink 1 simultaneously. The plurality of recording electrodes 3 are disposed in a close arrangement and are separated from each other by the ink 1. Accordingly, when the recording electrodes 3, particularly, the adjacent recording electrodes 3, are driven in different driving conditions, it is possible that a current flows from one to another recording electrode 3 due to the functions of the resistance factor and capacitance factor of the ink 1. Such phenomenon is possible to occur between the leads of the recording electrodes 3.

FIG. 12 shows an equivalent circuit for two adjacent recording electrode systems subject to the foregoing phenomenon. In FIG. 12, $V_1$ and $V_2$ are input voltages applied respectively to the driven recording electrode 3 and the undriven recording electrode 3, $V_3$ and $V_4$ are the respective surface potentials of the recording electrodes 3, and $R_1$ and $R_4$ are the respective total resistances of the recording electrode systems. The total resistance of each recording electrode system includes, for example, the internal resistances of the resistors and transistors of the driving circuit 8. Indicated at $R_2$ and $R_3$, and at C are resistance factors and capacitance factors between the recording electrode systems, for example, the factors of the ink 1 prevailing between the recording electrodes 3, and at $i_1$ to $i_4$ are currents which flow respectively through the resistors $R_1$ to $R_4$.

From the equivalent circuit, the following six expressions are obtained.

$$V_2=V_4-i_4\times R_4 \quad (1)$$

$$V_3=V_1-i_1\times R_1 \quad (2)$$

$$V_4=V_3-i_3\times R_3 \quad (3)$$

$$Q=C\times(V_3-V_4-i_2\times R_2) \quad (4)$$

$$dQ/dt=i_2 \quad (5)$$

$$i_1=i_2+i_3 \quad (6)$$

Eliminating $i_1$, $i_2$, $i_3$, Q and $V_4$ from expressions (1) to (6), we obtain $$V_3+A\times dV_3/dt-B\times V_1-\Gamma\times dV_1/dt-\Delta\times V_2-E\times dV_2/dt=0 \quad (7)$$

where $$A=C\times(R_1\times R_2+R_2\times R_3+R_3\times R_4+R_1\times R_3+R_2\times R_4)/(R_1+R_3+R_4)$$

$$B=(R_3+R_4)/(R_1+R_3+R_4)$$

$$\Gamma=C\times(R_2\times R_3+R_3\times R_4+R_4\times R_2)/(R_1+R_3+R_4)$$

$$\Delta=R_1/(R_1+R_3+R_4)$$

$$E=C\times(R_1\times R_2+R_1\times R_3)/(R_1+R_3+R_4)$$

Suppose that the adjacent two recording electrodes 3 are driven in three modes shown in Table 1.

TABLE 1

| Driving mode | Recording electrode $3_1$ | Recording electrode $3_2$ |
|---|---|---|
| 1 | OFF | OFF - ON - OFF |
| 2 | ON | OFF - ON - OFF |
| 3 | OFF - ON - OFF | OFF - ON - OFF |

Then, $V_2$ and $V_4$ for those modes are determined by the following procedure.. The procedure will be described hereinafter with reference to the Mode 1.

First, substituting $V_1=V\times u(t)$ (u(t) is a unitary step function, in which t>0 u(t)=0, t, 0 u(t)=0) and $V_2=0$ into Expression (7), we obtain for the leading edge of $V_3$ $$V_3+A\times dV_3/dt-B\times V\times u(t)-\Gamma\times V\times\delta(t)=0 \quad (8)$$

where δ(t) is a unitary impulse function δ(t)=du(T)/dt.

Subjecting Expression (8) to Laplace transformation, we obtain $$L(V_3)=(V_3(0)+\Gamma\times V/A)/(S+1/A)+B\times V/A/\{s\times(S+1/A)\} \quad (9)$$

where $V_3(0)$ is the initial value of $V_3$. Subjecting Expression (9) to Laplace transformation, we obtain $$V_3=B\times V+(V_3(0)+\Gamma\times V/A-B\times V)\times e^{-t/A}$$

and substituting 0 for $V_3(0)$, we obtain a solution $$V_3=(B+(\Gamma/A-B)e^{-t/A})\times V \quad \text{Solution 1}$$

For the trailing edge of $V_3$, substituting $V_1=V\times(1-u(t))$ and $V_2=0$ into Expression (7) and solving Expression (7) by the same procedure, we obtain a solution $$V_3=(B-\Gamma/A)\times e^{-t/A}\times V \quad \text{Solution 2}$$

Solutions for $V_4$ can be obtained similarly by eliminating $i_1$, $i_2$, $i_3$, Q and $V_3$ from Expressions (1) to (6) to express Expression (7) by $V_1$ and $V_2$. Solutions for $V_3$ and $V_4$ for Modes 2 and 3 can also be obtained through the same procedure. Voltage pulses thus determined are shown in FIGS. 13(*a*) to 13(*d*) respectively for $V_1$, $V_2$, $V_3$ and $V_4$ in Mode 1, FIGS. 14(*a*) to 14(*d*) respectively for $V_1$, $V_2$, $V_3$ and $V_4$ in Mode 2, and FIGS. 15(*a* ) to 15(*d*) respectively for $V_1$, $V_2$, $V_3$ and $V_4$ in Mode 3, in which voltage pulses are applied to one of the two recording electrodes 3 or to both the two recording electrodes 3. More concretely, in FIGS. 13(*a*) to 13(*d*), 14(*a*) to 14(*d*) and 15(*a*) to 15(*d*), input voltages of one of the recording electrode are shown in FIGS. 13(*a*), 14(*a*) and 15(*a*), output voltages of the same recording electrode are shown in FIGS. 13(*c*), 14(*c*) and 15(*c*), input voltages of the other recording electrode are shown in FIGS. 13(*b*), 14(*b*) and 15(*b*), and output voltages of the other recording electrode are shown in FIGS. 13(*d*), 14(*d*) and 15(*d*).

In FIGS. 15(*a*) to 15(*d*), the waveforms of the output voltages of the recording electrodes 3 are regular, because the two recording electrodes 3 are driven in the same driving mode, and hence there is no potential difference between the two recording electrodes 3 and no current flows across the two recording electrodes 3. On the contrary, in FIGS. 13(*a*) to 13(*d*) and 14(*a*) to 14(*d*), the waveforms of the output voltages of the recording electrodes 3 are irregular, because a current flows across the two recording electrodes 3 due to the agency of the resistance factor and capacitance factor of the ink 1.

Accordingly, the quantity of the ink 1 jetted from the front end 3*a* of the recording electrode 3 varies to deteriorate the quality of prints, when the recording electrodes 3 are driven under conditions where the waveforms of the surface potentials of the recording electrodes are irregular.

The mode of jetting the ink 1 is affected also by the distribution of electric field intensity in the electric field produced between the recording electrodes 3. FIGS. 16(*a*), 16(*b*) and 16(*c*) are equifield intensity contour maps showing the distribution of field intensity in electric fields produced between the plurality of recording electrodes 3 and the counterelectrode 5, in which indicated at A are equifield intensity curves. In FIGS. 16(*a*), 16(*b*) and 16(*c*), only three recording electrodes 3 are shown for simplicity.

In FIG. 16(*a*), a voltage is applied to all the three recording electrodes 3.

In FIG. 16(*b*), a voltage is applied only to the central recording electrode 3. In this state, the steepness of the equifield intensity curves A ascending toward the counterelectrode 5 is greater than that of the equifield intensity curves A of FIG. 16(*a*), and an electric field is produced between the driven recording electrode 3 and the adjacent undriven recording electrodes 3 as well as between the driven recording electrode 3 and the counterelectrode 5.

In FIG. 16(*c*), a voltage is applied to the central recording electrode 3 and one of the adjacent recording electrode 3 (the left-hand recording electrode 3 as viewed in FIG. 16(*c*)). The steepness of the equifield intensity curves A in FIG. 16(*c*) is smaller than that of the equifield intensity curves A in FIG. 16(*b*) and is greater than that of the equifield intensity curves A in FIG. 16(*a*). An electric field is produced, similarly to the state shown in FIG. 16(*b*), between the driven recording electrode 3 and the undriven recording electrode 3.

Thus, the gradient of the equifield intensity curves A represents the intensity of the electric field. Electrostatic force that acts on the ink at the front end of the recording electrode 3 is proportional to the gradient of the equifield intensity curve A, and the greater the gradient of the equifield intensity curve A, the greater is the quantity of ink jetted from the recording electrode 3. For example, the quantity of ink jetted in the state shown in FIG. 16(*b*) is greater than that in the state shown in FIG. 16(*a*). Accordingly, the quantity of ink jetted from the recording electrode 3 is dependent on the operating condition of the adjacent recording electrodes, and hence print quality is unstable.

OBJECT AND SUMMARY OF THE INVENTION

Accordingly, it is a first object of the present invention to provide a nonimpact printer having recording electrodes each capable of constantly jetting a fixed quantity of ink regardless of the operating condition of the adjacent recording electrodes.

It is a second object of the present invention to provide a nonimpact printer having recording electrodes capable of providing an output voltage having a regular waveform.

It is a third object of the present invention to provide a nonimpact printer having recording electrodes each capable of producing an electric field of a fixed field intensity distribution between the recording electrode and the counterelectrode.

It is a fourth embodiment of the present invention to provide a nonimpact printer having recording electrodes, and capable of correcting the surface potential of each recording electrode, and capable of correcting variation in the quantity of ink jetted from the electrode attributable to the variation of the field intensity of an electric field produced between the recording electrode and the counterelectrode so that dots formed by jetting ink are uniform in diameter and characters are formed in a high print quality.

DETAILED DESCRIPTION OF THE PREFERRED EMBODIMENTS

Figure 11:
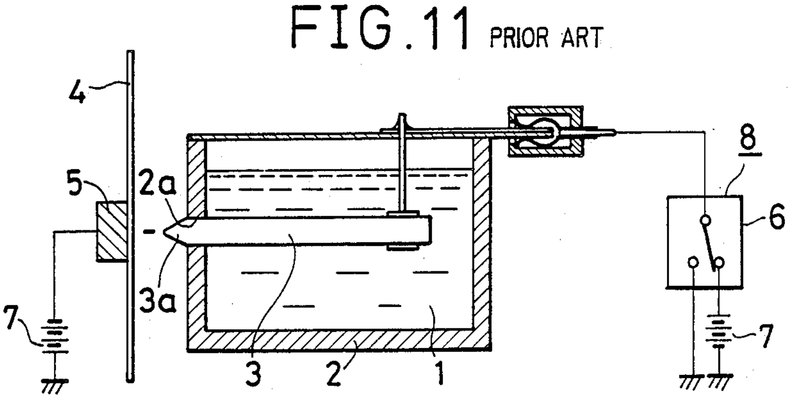
FIG. 11 PRIOR ART
FIG. 11 is a schematic longitudinal sectional side elevation of a nonimpact print head employed in a conventional nonimpact printer.
Figure 12:
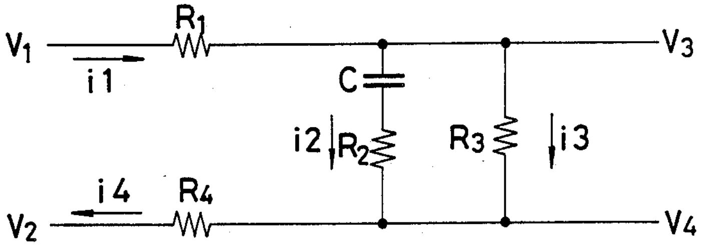
FIG. 12 PRIOR ART
FIG. 12 is an equivalent circuit of the input side and output side of the recording electrode of the nonimpact print head of FIG. 11.
Figure 13A:
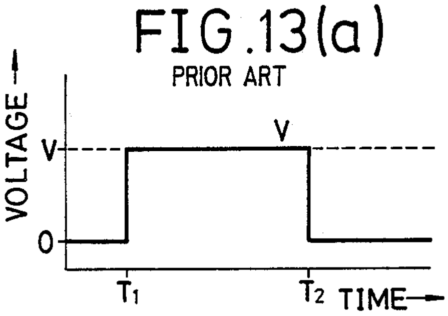
FIG. 13(a) PRIOR ART
FIGS. 13(ato 13(d), 14(a) to 14(d) and 15(a) to 15(d) are graphs showing the waveforms of input voltages and output voltages of two adjacent recording electrodes.
Figure 13C:
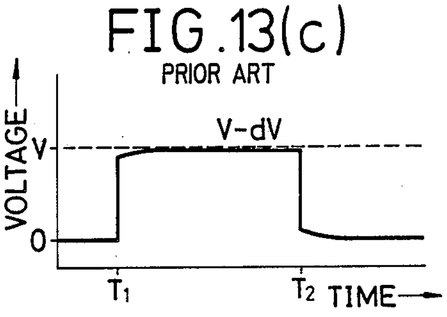
FIG. 13(c) PRIOR ART
Figure 13B:
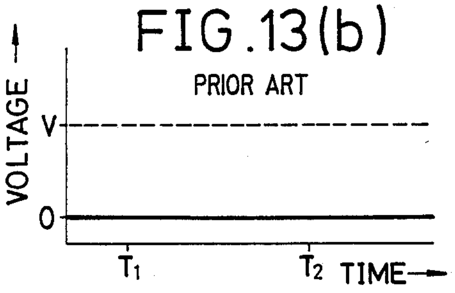
FIG. 13(b) PRIOR ART
Figure 13D:
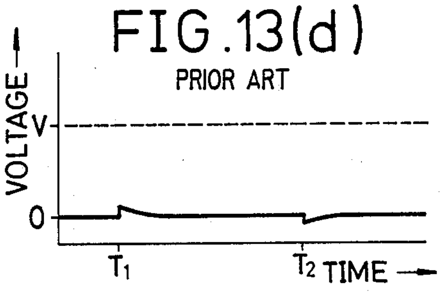
FIG. 13(d) PRIOR ART
Figure 14A:
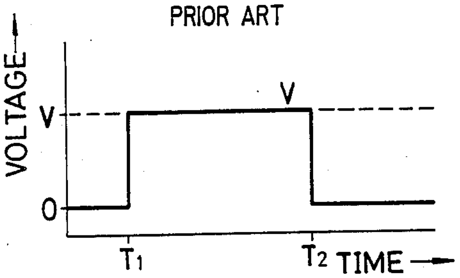
FIG.14(a) PRIOR ART
Figure 14C:
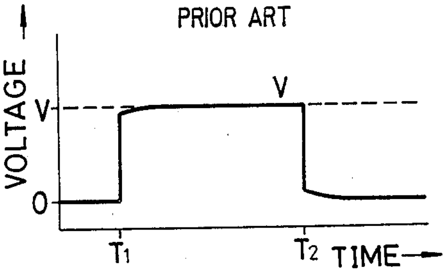
FIG.14(c) PRIOR ART
Figure 14B:
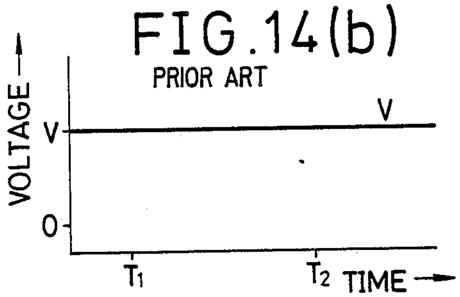
FIG.14(b) PRIOR ART
Figure 14D:
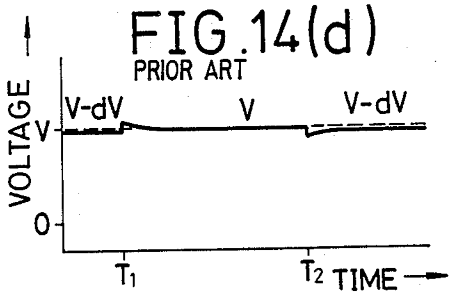
FIG.14(d) PRIOR ART
Figure 15A:
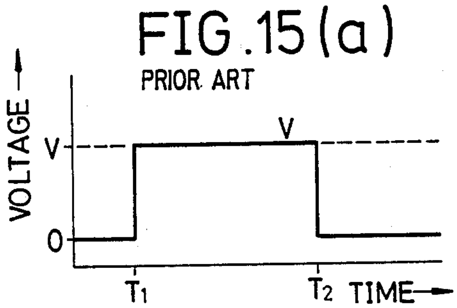
FIG.15(a) PRIOR ART
Figure 15C:
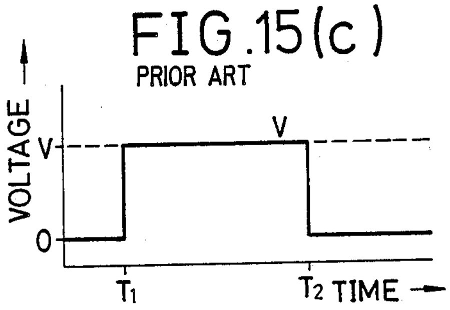
FIG.15(c) PRIOR ART
Figure 15B:
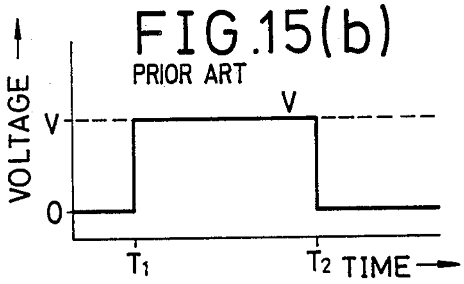
FIG.15(b) PRIOR ART
Figure 15D:
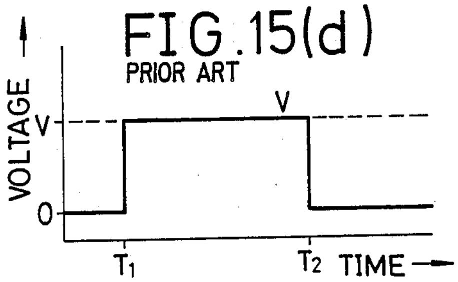
FIG.15(d) PRIOR ART

A nonimpact printer in a first embodiment according to the present invention will be described hereinafter with reference to FIGS. 1 to 8, in which parts like or corresponding to those previously described with reference to FIGS. 11 and 12 are based on the same theory as that on which those previously described with reference to FIGS. 11 and 12, and hence the description thereof will be omitted and FIGS. 11 and 12 will be cited when necessary.

Figure 2:
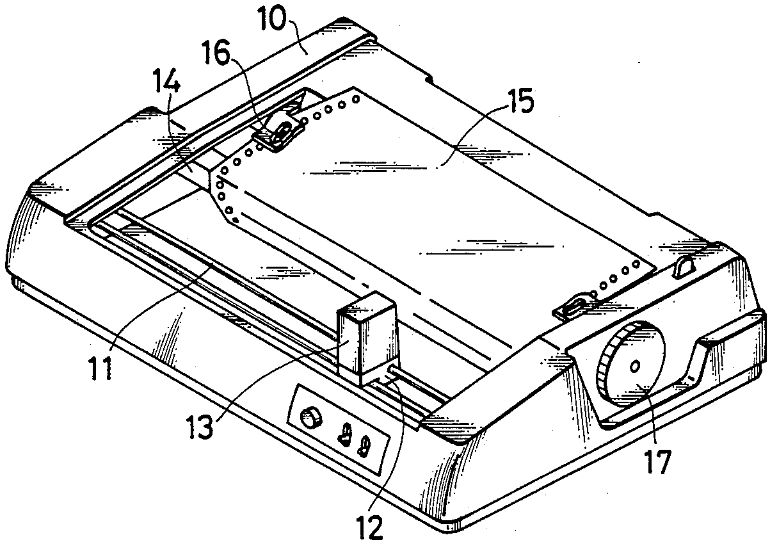
FIG. 2 is a perspective view of the nonimpact printer of FIG. 1.

Referring particularly to FIG. 2 showing a nonimpact printer in a first embodiment according to the present invention, two parallel guide shafts 11 are extended in a main case 10, a carriage 12 is mounted sidably on the two guide shafts 11, a print head 13 is mounted on the carriage 12, and an elongate counterelectrode 14 is extended laterally in the direction of travel of the print head 13 in the middle section of the main case 10 opposite to the print head 13 with a fixed gap therebetween. Tractor wheels 16 are provided respectively near the opposite ends of the counterelectrode 14 to feed a recording sheet 15. A knob 17 is attached to one end of a shaft supporting the tractor wheels 16.

Figure 1:
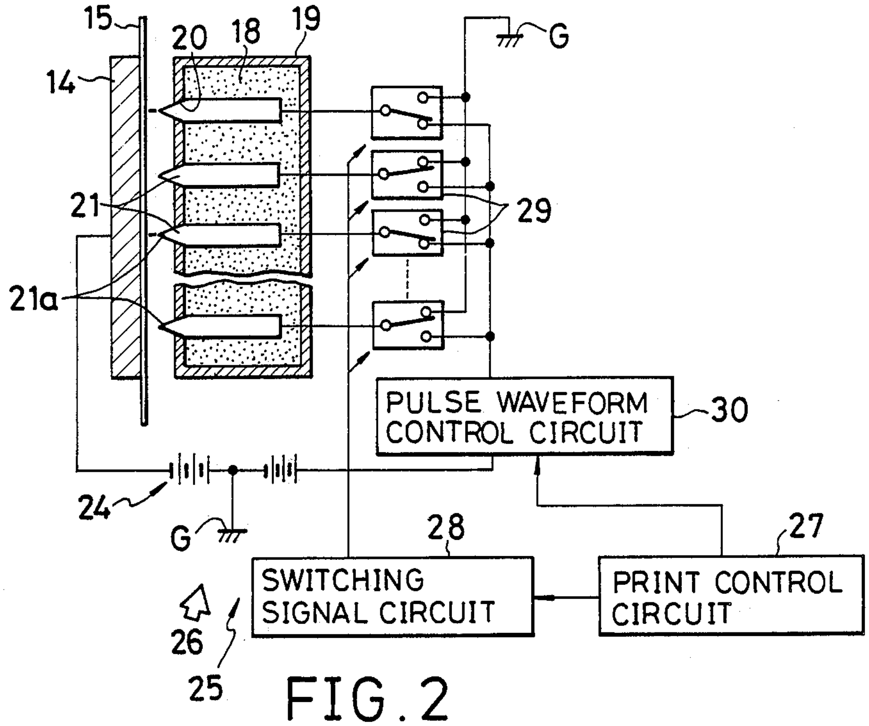
FIG. 1 is a schematic longitudinal sectional side elevation of a nonimpact print head incorporated into a nonimpact printer in a first embodiment according to the present invention, shown in connection with an associated electric circuit.

Referring to FIG. 1, the print head 13 has an ink case 19 containing ink 18. A plurality of electrode holes 20 are formed in an arrangement in a vertical row in a side wall of the ink case 19 facing the counterelectrode 14. A plurality of recording electrode 21 are provided in the ink case 19 so that the respective front ends thereof project respectively through the electrode holes 20 toward the counterelectrode 14.

Figure 3:
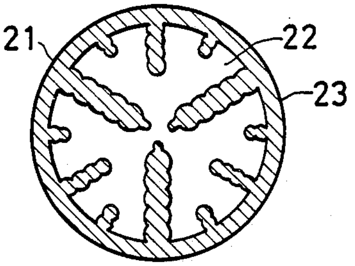
FIG. 3 is a cross-sectional view of a recording electrode.

As shown in FIG. 3, each recording electrode 21 is formed of polyacetal or polyethylene terephthalate by an extrusion molding process, has a longitudinal through hole 22 formed along the longitudinal axis thereof, and a taper front end 21a. The surface of the recording electrode 21 is coated with a metallic thin film 23. Thus, the recording electrode 21 is electrically conductive and is capable of containing the ink 18. The recording electrode 21 need not be limited to such a recording electrode, but the following recording electrodes may be employed.

(1) A recording electrode formed of a conductive plastic material containing carbon particles by an extrusion molding process and having a longitudinal through hole 22.

(2) A recording electrode formed by extruding a kneaded mixture of alumina particles and a binder in a tubular body having a longitudinal through hole 22, sintering the extruded tubular body and coating the surface of the sintered tubular body with a metallic thin film.

(3) A recording electrode formed by extruding a kneaded mixture of metallic or carbon particles and a binder in a tubular body having a longitudinal through hole 22, and sintering the extruded tubular body.

Essentially, any conductive tubular member having the shape of a recording electrode and capable of containing ink therein may be employed.

The recording electrodes 21 are connected electrically to the counterelectrode 14 by a driving circuit 26 comprising a power supply 24 and a switching circuit 25. The switching circuit 25 includes a print control circuit 27, a switching signal circuit 28 connected to the print control circuit 27, and switches 29 which are connected respectively to the recording electrodes 21. Each switch 29 has a first contact connected to a ground G, and a second contact connected through the power supply 24 to the counterelectrode 14. The power supply 24 comprises a first power supply 24a connected to the counterelectrode 14, and a second power supply 24b connected to the recording electrodes 21. The junction of the first power supply 24a and the second power supply 24b is connected to the ground G.

Figure 4:
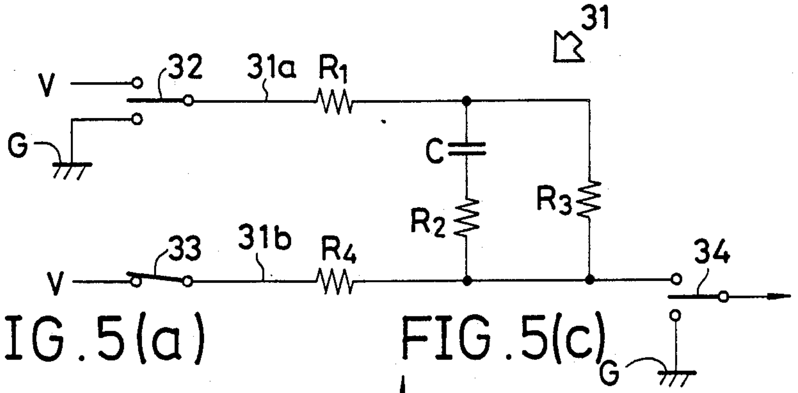
FIG. 4 is a circuit diagram showing a portion of a pulse waveform control circuit.
Figure 5A:
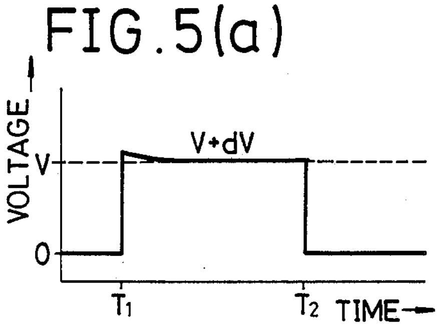
FIGS. 5(*a*) to 5(*d*), 6(*a*) to 6(*d*) and 7(*a*) to 7(*d*) are graphs comparatively showing the input voltage pulses and output voltage pulses of two adjacent recording electrodes.
Figure 5C:
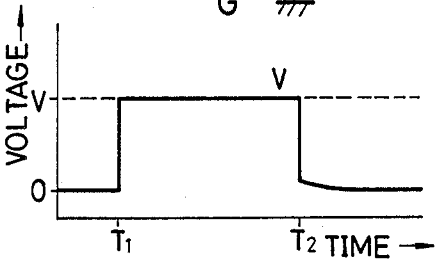
Figure 5B:
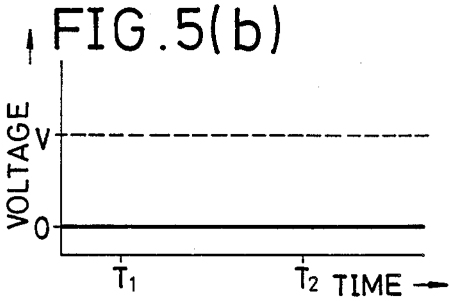
Figure 5D:
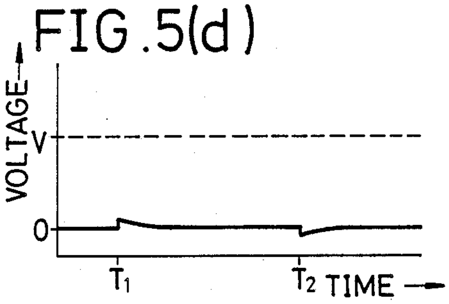
Figure 6A:
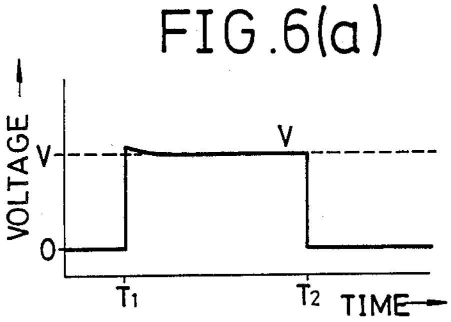
Figure 6B:
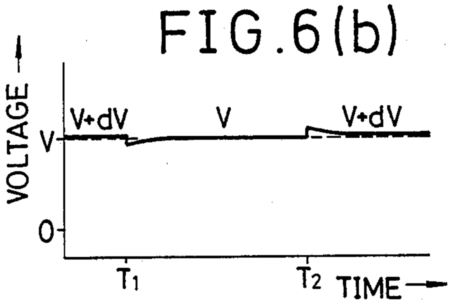
Figure 6C:
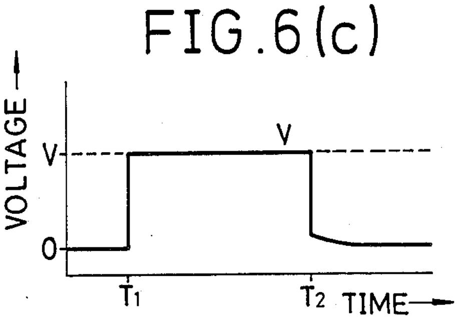
Figure 6D:
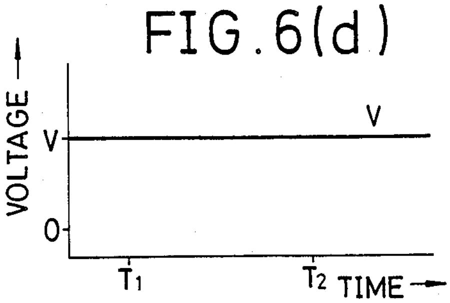
Figure 7A:
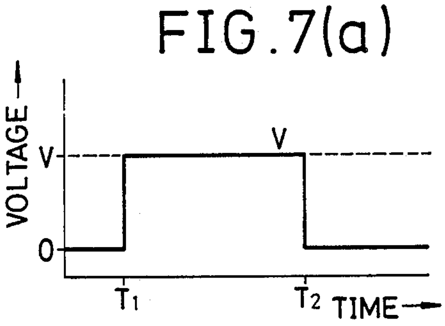
Figure 7B:
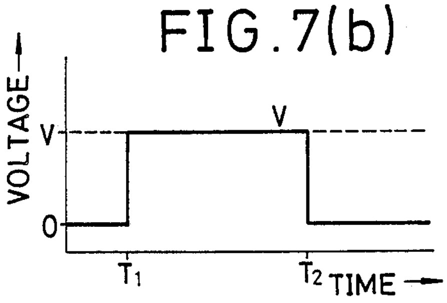
Figure 7C:
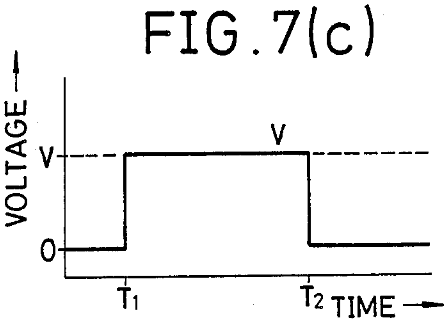
Figure 7D:
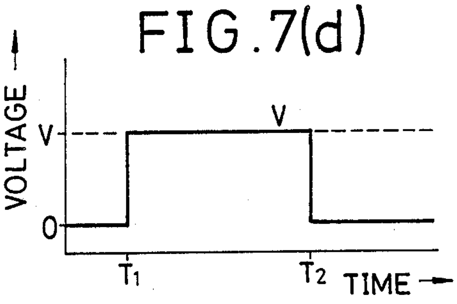

A pulse waveform control circuit 30 is connected to the respective second contacts of the switches 29, to the second power supply 24b, and to the print control circuit 27. The print control circuit 27 controls the pulse waveform control circuit 30 so as to control the waveforms of voltage pulse signals to be applied to the recording electrodes 21 according to a recording electrode driving mode. More concretely, The pulse waveform control circuit 30 has, for each recording electrode 21, an input system 31 connected to the power supply 24 and having a circuit construction as shown in FIG. 4. The input system 31 has an additional system 31a consisting of a switch A 32 having a contact connected to the ground G, and a resistor $R_1$, and a main system 31b consisting of a switch B 33 and a resistor $R_4$. The main system 31b is connected through a switch C 34 having a contact connected to the ground G to the recording electrode 21. The additional system 31a is connected to the main system 31b through a parallel connection of a series condition of a capacitor C and a resistor $R_2$, and a resistor $R_3$. The resistors $R_1$ to $R_4$ and the capacitor C correspond respectively to those described with reference to FIG. 12.

The ink 18 flows into the through hole 22 from the rear end of the recording electrode 21 to fill up the through hole 22 including a portion in the front end 21a of the recording electrode 21. In a preparatory state, the voltage of the first power supply 24a is applied across the recording electrodes 21 and the counterelectrode 14 as a base voltage to exert an electrostatic force on the ink 18 prevailing in the front ends 21a of the recording electrodes 21. This electrostatic force is sufficient to make the ink 18 ready to be jetted, but is not strong enough to accelerate the ink 18 toward the counterelectrode 14.

When optional recording electrodes 21 among the plurality of recording electrodes 21 are driven selectively by the driving circuit 26, the electrostatic force exerted on the ink 18 in the respective front ends 21a of the selected recording electrodes 21 is enhanced to jet the ink 18 from the selected recording electrodes 21. More specifically, the switching signal circuit 28 gives a switching signal selectively to the switches 29 corresponding to the selected recording electrodes 21 according to a print command signal given thereto by the print control circuit 27. Upon the reception of the switching signal, each switch 29 opens the first contact connected to the ground G and closes the second contact connected to the power supply 24 to apply the voltage of the second power supply 24*b*, which is sufficiently high to jet the ink 18, across the corresponding recording electrode 21 and the counterelectrode 14, and thereby the ink 18 is jetted from the front end 21*a* of the recording electrode 21 and is deposited in a dot on the recording sheet 15 to form a character.

The pulse waveform of the output voltage of the recording electrode 21 is irregular as shown in FIGS. 13(*c*) and 13(*d*), FIGS. 14(*c*) and 14(*d*) or FIGS. 15(*c*) and 15(*d*) without the function of the pulse waveform control circuit 30. The pulse waveform control circuit 30 applies beforehand a voltage pulse having an irregular waveform to the recording electrode 21. For example, in the driving mode 1 (Table 1), the pulse waveform control circuit 30 regulates the leading edge of the voltage pulse $V_1$ at a voltage corresponding to the solution 1, and the trailing edge of the voltage pulse $V_1$ at a voltage corresponding to the solution 2 on conditions that (a) printing condition is unaffected by voltage variation within a voltage range insufficient to jet the ink, and (b) printing condition is unaffected by the current that flows through the resistor $R_3$.

A voltage variation of the condition (a) is in the range of 20 to 200 V for V=1400 V. The ink 18 is not accelerated to form a dot even if 200 V is applied to the recording electrode 21. A voltage variation of the condition (b) is 20 V for V=1400 V, and the size of a dot in unafected by such a small voltage variation. In operation, the pulse waveform control circuit 30 changes the switching condition of the switch A 32, the switch B 33 and the switch C 34 properly according to the operating condition of the adjacent recording electrodes 21. The operating conditions of the switches A 32, B 33 and C 34 in the driving modes 1 and 2 are tabulated in Table 2. The waveform of the output voltage of the recording electrode 21 is corrected as shown in FIGS. 5(*a*) to 5(*d*) (driving mode 1), FIGS. 6(*a*) to 6(*d*) (driving mode 2), and FIGS. 7(*a*) to 7(*d*) (driving mode 3) by changing the operating condition of the switches A 32, B 33 and C 34 in the manners shown in Table 2. FIGS. 5(*a*), 6(*a*) and 7(*a*) are graphs showing the waveform of $V_2$, FIGS. 5(*b*), 6(*b*) and 7(*b*) are graphs showing the waveform of $V_2$, FIGS. 5(*c*), 6(*c*) and 7(*c*) are graphs showing the waveform of $V_3$, and FIGS. 5(*d*), 6(*d*) and 7(*d*) are graphs showing the waveform of $V_4$. The waveform of the output voltage of the recording electrode 21 thus being corrected, a fixed quantity of the ink 18 is jetted for every printing operation from the front end 21*a* of the recording electrode 21, and thereby dots having the same size are formed on the recording sheet 15 to form characters in a high print quality.

TABLE 2

| Corrected values | Switches | Closed contacts | | |
|---|---|---|---|---|
| | | $T_l$ | | $T_2$ |
| $V_3$ in driving mode 1 | A | G | V | G |
| | B | V | V | V |
| | C | G | V | G |
| $V_3$ in driving mode 2 | A | G | V | G |
| | B | V | V | V |
| | C | G | V | G |
| $V_4$ in driving mode 2 | A | V | G | V |
| | B | V | V | V |
| | C | V | V | V |

Figure 8:
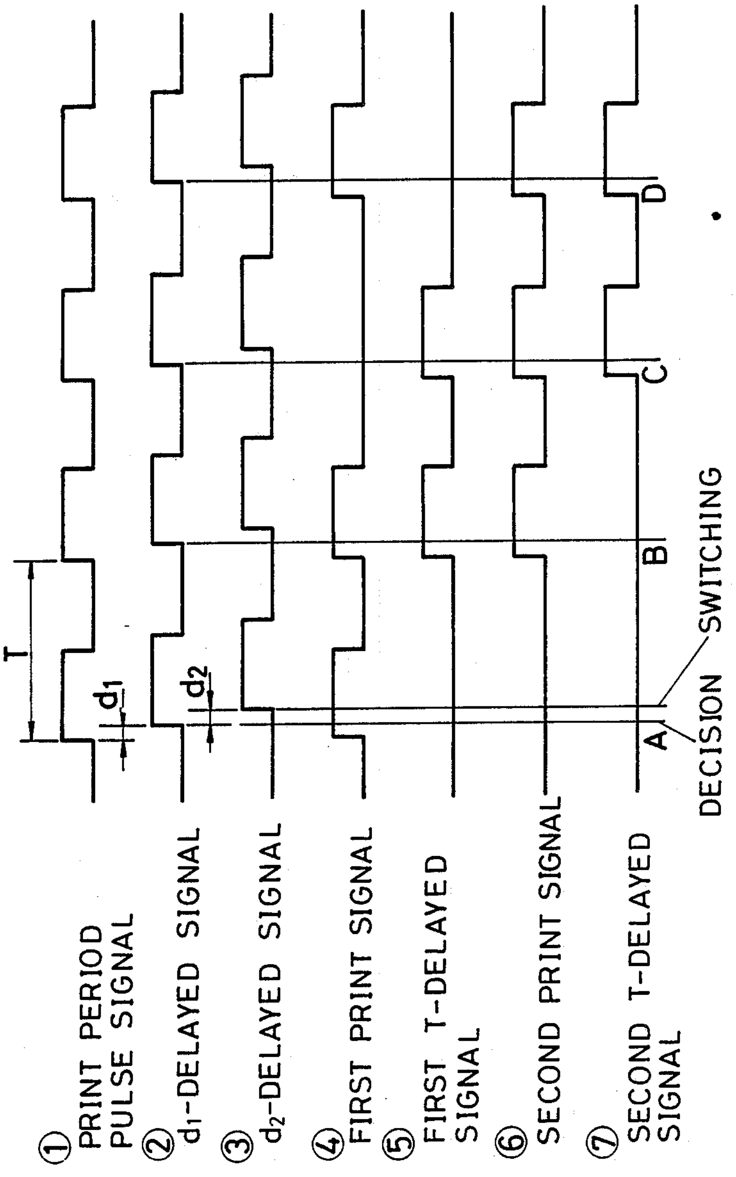
FIG. 8 is a time chart showing a periodic print timing pulse signal and input voltages of recording electrodes in relation to switching operation.
Figure 9:
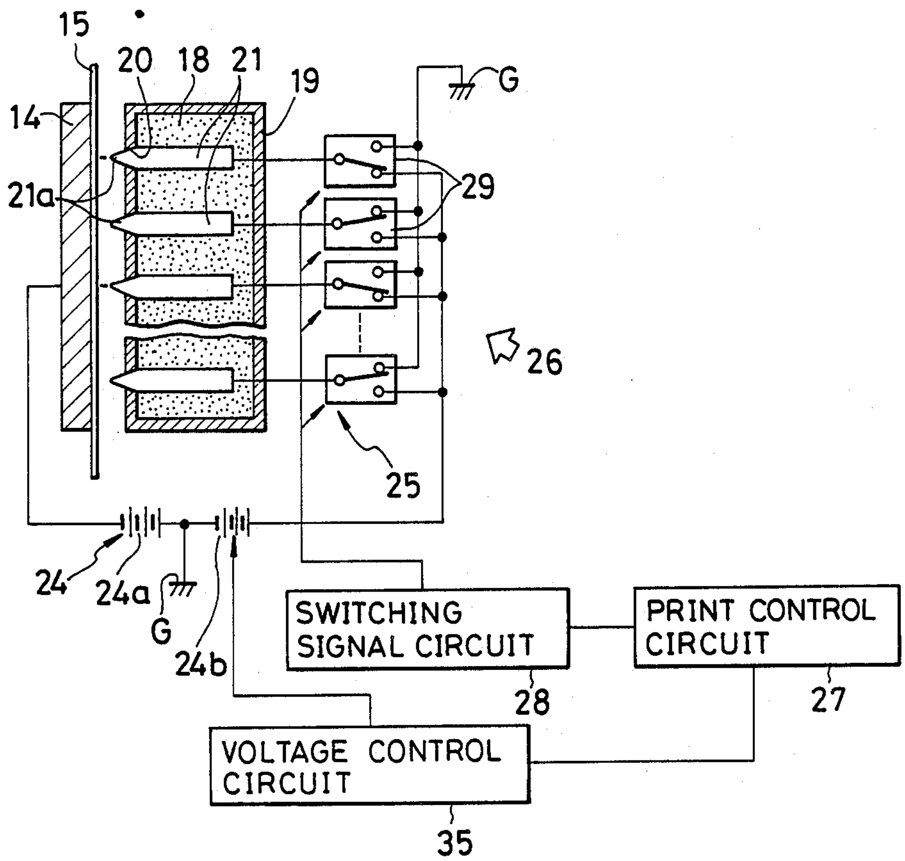
FIG. 9 is a schematic longitudinal sectional side elevation of a nonimpact print head employed in a nonimpact printer in a second embodiment according to the present invention, shown in connection with an associated electric circuit.

Referring now to FIG. 8, on the basis of a print period pulse signal ① having a period T, a $d_1$-delayed signal ②, a $d_2$-delayed signal ③, a first print signal ④, a first T-delayed signal ⑤ delayed by T from the print period pulse signal 1 , a second print signal ⑥ for the adjacent recording electrode 21, and a second T-delayed signal ⑦ delayed by T from the second print signal ⑥ are prepared. At the leading edge of the $d_1$-delayed signal ②, the signals ④ to ⑦ are sampled and a decision is made, and then the switching operation is carried out at the leading edge of the $d_2$-delayed signal ③ on the basis of the decision. The delay time $d_1$ is longer than the rise time of the signals ④ to ⑦, and the delay time $d_2$ is longer than a time necessary for decision. From Table 2 and FIG. 8, decisions A, B, C and D are:

A: Switching for $V_3$ in the driving mode 1 at time $T_2$
B: Switching for $V_4$ in the driving mode 2 at time $T_1$
C: A driving mode other than those shown in table 2
D: Switching for $V_3$ in the driving mode 2 at time $T_1$ A nonimpact printer in a second embodiment according to the present invention will be described hereinafter with reference to FIG. 9 showing a print head 13 and the associated electric circuits employed in a nonimpact printer in the second embodiment according to the present invention, in which parts like or corresponding to those previously described with reference to the first embodiment are denoted by the same reference numerals and the description thereof will be omitted.

The print head 13 has an ink case 19 containing ink 18. A plurality of electrode holes 20 are formed in an arrangement in a vertical row in a side wall of the ink case 19 facing a counterelectrode 14. A plurality of recording electrodes 21 are placed in the ink case 19 with the respective front ends 21*a* thereof projecting through the electrode holes 22 toward the counterelectrode 14.

The recording electrodes 21 are connected electrically to the counterelectrode 14 by a driving circuit 26 comprising a power supply 24 and a switching circuit 25. The switching circuit 25 comprises switches 29 connected to a switching signal circuit 28, which in turn is connected to a print control circuit 27. The switches 29 are connected respectively to the recording electrodes 21. Each switch 29 has a first contact connected to a ground G, and a second contact connected through the power supply 24 to the counterelectrode 14. The power supply 24 comprises a first power supply 24*a* connected to the counterelectrode 14, and a second power supply 24*b* connected to the recording electrodes 21. The junction of the first power supply 24*a* and the second power supply 24*b* is connected to the ground G. A voltage control circuit 35 is connected to the second power supply 24*b* and to the print control circuit 27. The voltage control circuit 35 regulates the output voltage of the second power supply 24*b* according to the operating condition of each recording electrode 21.

The ink 18 flows into the through hole 22 of each recording electrode 21 from the rear end of the same to fill up the through hole 22 including a portion in the front end 21a of the recording electrode 21. In a preparatory state, the voltage of the first power supply 24a is applied across the recording electrodes 21 and the counterelectrode 14 as a base voltage to exert an electrostatic force on the ink 18 prevailing in the front ends 21a of the recording electrodes 21. This electrostatic force is sufficient to make the ink 18 ready to be jetted, but is not strong enough to accelerate the ink 18 toward the counterelectrode 14.

When optional recording electrodes 21 among the plurality of recording electrodes 21 are driven selectively by the driving circuit 26, the electrostatic force exerted on the ink 18 in the respective front ends 21a of the selected recording electrodes 21 is enhanced to jet the ink 18 from the selected recording electrodes 11. More specifically, the switching signal circuit 28 gives a switching signal selectively to the switches 29 corresponding to the selected recording electrodes 21 according to a print command signal given thereto by the print control circuit 27. Upon the reception of th switching signal, each switch 29 opens the first contact connected to the ground G and closes the second contact connected to the power supply 24 to apply the voltage of the second power supply 24b, which is sufficiently high to jet the ink 18, across the corresponding recording electrode 21 and the counterelectrode 14, and thereby the ink 18 is jetted from the front end 21a of the recording electrode 21 and is deposited in a dot on a recording sheet 15 to form a character.

The output voltage of the second power supply 24b is regulated properly by the voltage control circuit 35. Since the plurality of recording electrodes 21 are disposed in a close arrangement, the field intensity distribution of an electric field produced between the front end 21a of one of the recording electrodes 21 and the counterelectrode 14 varies according to the operating condition of the adjacent recording electrodes 21, namely, whether or not a voltage is applied to the adjacent recording electrodes 21, as described previously with reference to FIGS. 16(a), 16(b), and 16(c). In the second embodiment, the output voltage of the second power supply 24b is regulated properly by the voltage control circuit 35 to maintain the field intensity distribution of the electric field between the recording electrode 21 and the counterelectrode 14 constantly in a specific reference field intensity distribution. More concretely, the specific reference field intensity distribution is determined on the basis of a field intensity distribution indicated by equifield intensity contour lines A in FIG. 16(a) or 16(b). The voltage control circuit 35 regulates the output voltage of the second power supply 24b to maintain the reference field intensity distribution on the basis of a control signal provided by the print control circuit 27 indicating the operating condition of the adjacent recording electrodes, namely, whether one of the two adjacent recording electrodes 21 is driven or whether both the adjacent recording electrodes 21 are driven. Consequently, an electric field of a fixed field intensity distribution is produced always between the recording electrode 21 and the counterelectrode 14 when the recording electrode 21 is driven, and hence a fixed quantity of the ink 18 is jetted from the front end 21a of the recording electrode 21 when the same is driven. Accordingly, the jetted ink 18 is deposited in a fixed size on the recording sheet 15, and hence characters are formed in a high print quality.

Figure 16A:
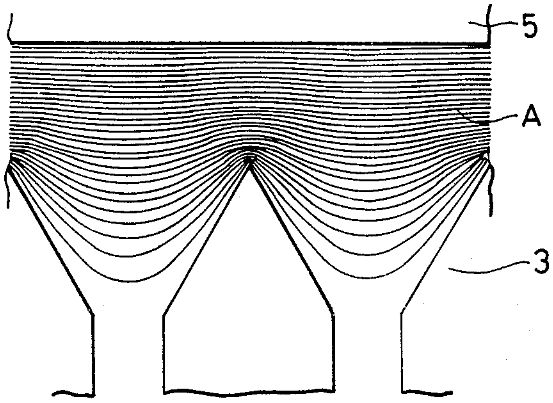
FIG.16(a) PRIOR ART
FIGS. 16(a) to 16(c) are equifield intensity contour maps of electric fields produced between recording electrodes and the counterelectrode.
Figure 16B:
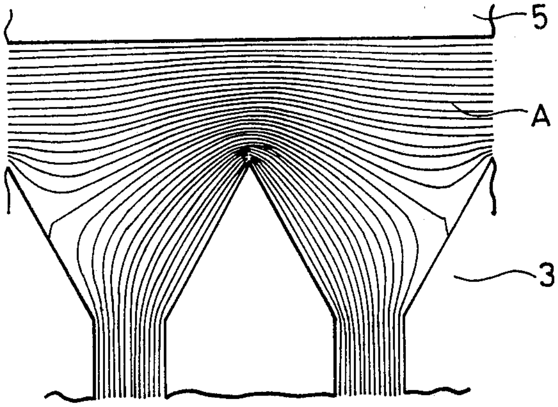
FIG.16(b) PRIOR ART
Figure 16C:
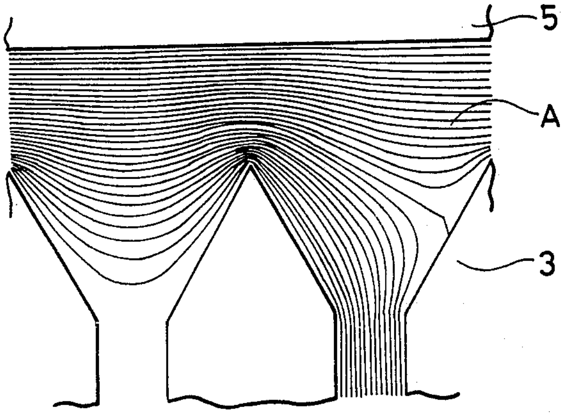
FIG.16(c) PRIOR ART

Each recording electrode 21 employed in the second embodiment is coated with a conductive metallic thin film 23. Therefore, an electric field as shown in FIG. 16(b) or 16(c) is produced between the adjacent recording electrodes 21 when the adjacent recording electrodes 21 are driven simultaneously. This electric field urges the ink 18 stored in the through hole 22 of the recording electrode 21 toward the front end 21a of the recording electrode 21, and thereby an excessive ink 18 is jetted from the recording electrode 21. Accordingly, the voltage control circuit 35 regulates the output voltage of the second power supply 24b taking into consideration such a phenomenon to maintain the quantity of the ink 18 to be jetted by the recording electrode 21 for every printing operation correctly at a fixed value.

Figure 10:
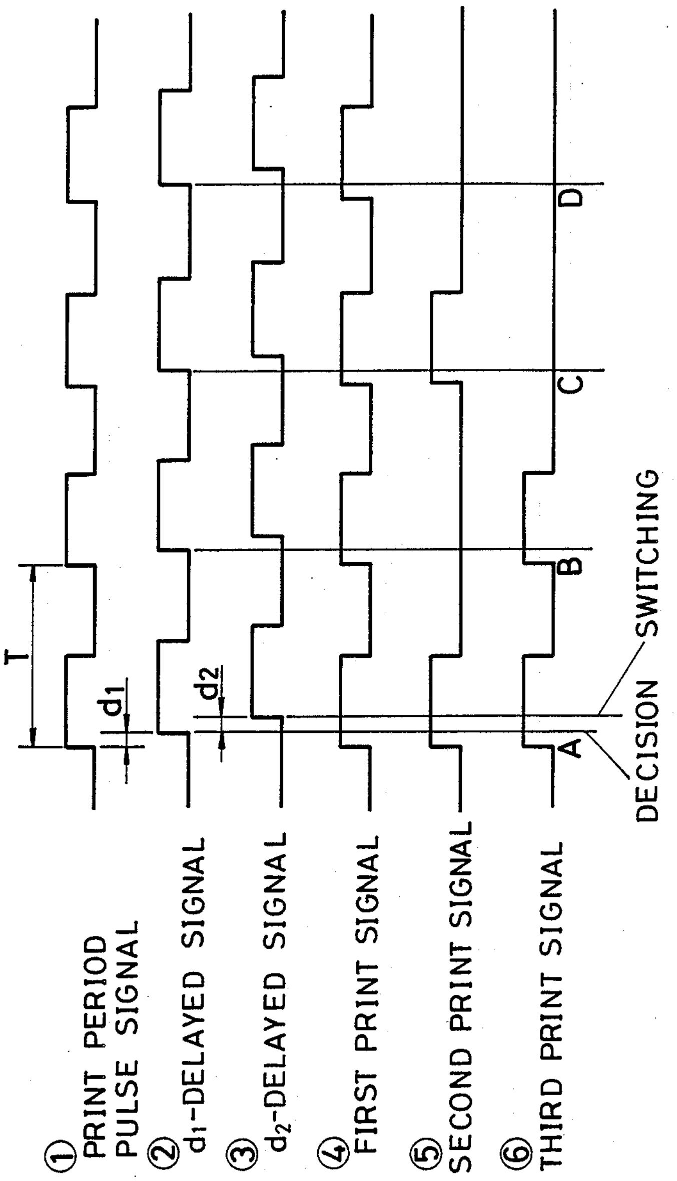
FIG. 10 is a time chart showing a periodic print timing pulse signal and input voltages of recording electrodes in relation to switching operation.

Referring to FIG. 10, a $d_1$-shaped signal ② delayed by $d_1$ from a print period pulse signal ① having a period T, a $d_2$-delayed signal ③ delayed by $d_2$ from the $d_1$-delayed signal ②, a first print signal ④, a second print signal ⑤, and a third print signal ⑥ are prepared on the basis of the print period pulse signal ①. At the leading edge of the $d_1$-delayed signal ②, the signals ④, ⑤ and ⑥ are sampled and a decision is made, and then switching operation according to the result of the decision is carried out at the leading edge of the signal ③ to vary the voltage. The delay time $d_1$ is longer than the rising time of the signals ④, ⑤ and ⑥, and the delay time $d_2$ is longer than a time necessary for the decision. Decisions A, B, C and D in FIG. 10 correspond to the conditions shown in FIGS. 16(a), 16(b) and 16(c) as follows.

A: FIG. 16(a) High voltage
B: FIG. 16(c) Moderate voltage
C: FIG. 16(b) Low voltage As is apparent from the foregoing description, according to the present invention, a plurality of recording electrodes capable of jetting ink from the respective front ends thereof are mounted on a carriage, a counterelectrode is disposed opposite to the recording electrodes with a recording sheet therebetween, and the pulse waveform of a voltage to be applied to one of the recording electrodes by the driving circuit which applies voltage pulses selectively across the recording electrodes and the counterelectrode is regulated according to the operating condition of other recording electrodes by the pulse waveform control circuit. Accordingly, a voltage pulse having a regular waveform is applied to the recording electrode regardless of the operating condition of other recording electrodes, so that a fixed quantity of the ink is jetted from the front end of each recording electrode regardless of the operating condition of the rest of the recording electrodes, and thereby characters are formed in a high print quality.

Furthermore, according to the present invention, a plurality of recording electrodes capable of jetting ink from the respective front ends thereof are mounted on a carriage, a counterelectrode is disposed opposite to the recording electrodes with a recording sheet therebetween, and a voltage to be applied to one of the recording electrodes by the driving circuit which applies a voltage selectively across the recording electrodes and the counterelectrode is regulated according to the operating condition of the adjacent recording electrodes by the voltage control circuit. Accordingly, the field intensity distribution of an electric field produced between the recording electrode and the counterelectrode can be maintained in a specific reference field intensity distribution, so that a fixed quantity of the ink is jetted from the front end of the recording electrode for every printing operation, and thereby characters are formed in a high print quality.

What is claimed is:

1. A printer comprising:
- a plurality of recording electrodes storing ink therein;
- a counterelectrode disposed opposite to the plurality of recording electrodes with a recording sheet therebetween;
- a driving circuit for selectively applying a voltage pulses across the recording electrodes and the counterelectrode; and
- a pulse waveform control circuit for regulating the waveform of a voltage pulse to be applied to one of the plurality of recording electrodes by the driving circuit according to the mode of driving the rest of the recording electrodes.

2. A printer according to claim 1, wherein said pulse waveform control circuit has an input system comprising an additional system including a switch capable of being connected to a ground, and resistance elements; and a main system including a switch, and a resistance element.

3. A printer comprising:
- a plurality of recording electrodes storing ink therein;
- a counterelectrode disposed opposite to the plurality of recording electrodes with a recording sheet therebetween;
- a driving circuit for selectively applying a voltage pulses across the recording electrodes and the counterelectrode; and
- a voltage control circuit for controlling a voltage to be applied to one of the plurality of recording electrodes by the driving circuit according to the mode of driving the rest of the recording electrodes to produce an electric field of a specific fixed condition between the recording electrode and the counterelectrode.

4. A printer according to claim 1 or 3, wherein each of said recording electrodes is a member formed by extruding a synthetic resin, having an axial through hole and a taper front end, and coated over the entire surface thereof with a metallic thin film.

5. A printer according to claim 1 or 3, wherein each of said recording electrodes is a tubular member having an axial through hole, formed by extruding a plastic material containing carbon particles.

6. A printer according to claim 1 or 3, wherein each of said recording electrodes is a tubular member having an axial through hole, formed by extruding a kneaded mixture of alumina particles and a binder in a tubular body and sintering the extruded tubular body.

7. A printer according to claim 1 or 3, wherein each of said recording electrode is a tubular member having an axial through hole, formed by extruding a kneaded mixture of metallic or carbon powder and a binder in a tubular body and sintering the extruded tubular body.

8. A printer according to claim 1 or 3, wherein said recording electrodes are arranged in a single vertical row.

* * * * *